United States Patent Office.

CARLETON B. HUTCHINS, OF ANN ARBOR, MICHIGAN.

Letters Patent No. 85,666, dated January 5, 1869.

IMPROVED ROOFING-COMPOSITION.

The Schedule referred to in these Letters Patent and making part of the same.

*To all whom it may concern:*

Be it known that I, CARLETON B. HUTCHINS, of Ann Arbor, in the county of Washtenaw, in the State of Michigan, have invented an Improved Composition for Covering Roofs, and for various other purposes; and I do hereby declare that the following is a full and exact description thereof.

The nature of my invention consists in the compounding of ingredients for covering roofs, and for various other purposes.

To enable others skilled in the art to compound and use my invention, I will proceed to describe the compounding and the use of the same.

I take one pound of pure rosin, one pound of whiting, or soft, adhesive ground stone of any kind, four pounds of sifted gravel or sand, four to six ounces of linseed-oil. I pound the rosin up fine, and pulverize the whiting. I heat the gravel or sand, or not, as is convenient, before putting it with the rosin. I then put all into a kettle, and heat it slowly, until the rosin is melted thoroughly, and then I stir until all is well mixed.

I am careful not to heat the ingredients hot enough to injure the oil.

The linseed-oil can be diminished or increased, to make the composition suitable to be applied.

Apply, with or without an underlay of paper, when warm, with a trowel or brush, and smooth it down with a self-heating sad-iron or heated trowel. Then sand or gravel may be sifted upon the surface while warm.

What I claim as my invention, and desire to secure by Letters Patent, is—

The compounding of ingredients, as herein described, to make a composition for roofing, and for various other purposes, as before described.

C. B. HUTCHINS.

Witnesses:
H. B. HUTCHINS,
JOHN I. THOMPSON.